United States Patent [19]

Langguillat et al.

[11] Patent Number: 4,693,919

[45] Date of Patent: Sep. 15, 1987

[54] PROTECTIVE DEVICE AND METHOD FOR FORMING PROTECTIVE DEVICE AND USE OF PROTECTIVE DEVICE AS A PACKAGE AND APPARATUS FOR FORMING PROTECTIVE DEVICE

[75] Inventors: Jean-Paul Languillat, Thorigny-sur-Oreuse; Jean-Michel Morel, Sens; Jacques Queyrat, Pont sur Yonne, all of France

[73] Assignee: Lhomme S.A., Point sur Yonne, France

[21] Appl. No.: 739,928

[22] Filed: May 31, 1985

[51] Int. Cl.[4] ........................ B32B 3/30; B65B 11/00; A45C 1/12; B65D 81/02

[52] U.S. Cl. ...................................... 428/36; 428/182; 150/52 F; 229/8.5; 206/591

[58] Field of Search ................ 428/36, 182; 150/52 F; 229/8.5; 206/591, 594, 592

[56] References Cited

U.S. PATENT DOCUMENTS

| | | | |
|---|---|---|---|
| 1,149,532 | 8/1915 | Morford | 428/35 |
| 1,642,330 | 9/1927 | Brownstein | 93/96 |
| 1,853,945 | 4/1932 | Unke . | |
| 1,962,171 | 6/1934 | Bodor . | |
| 2,126,117 | 8/1938 | Kasdorf | 93/60 |
| 2,212,423 | 8/1940 | Kytle . | |
| 2,356,023 | 8/1944 | Alles | 240/108 |
| 2,701,584 | 2/1955 | Philips | 93/60 |
| 3,168,209 | 2/1965 | Brookins et al. . | |
| 3,285,401 | 11/1966 | May | 206/46 |
| 3,410,473 | 11/1968 | Petrie | 229/4.5 |
| 3,654,006 | 4/1972 | Heller, Jr. et al. | 756/108 |
| 3,666,168 | 5/1972 | Partain et al. | 229/40 |
| 3,779,298 | 12/1973 | Piccirilli et al. | 150/52 R |
| 3,952,477 | 4/1976 | Candor et al. | 53/3 |
| 4,020,140 | 4/1977 | Rumball | 264/261 |
| 4,040,229 | 8/1977 | Candor et al. | 53/29 |
| 4,126,238 | 11/1978 | Ravsing | 215/1 C |

FOREIGN PATENT DOCUMENTS

| | | | |
|---|---|---|---|
| 729518 | 1/1943 | Fed. Rep. of Germany . | |
| 1245145 | 9/1960 | France . | |
| 420981 | 3/1967 | Switzerland . | |
| 193635 | 3/1923 | United Kingdom | 150/52 F |

*Primary Examiner*—John E. Kittle
*Assistant Examiner*—Patrick J. Ryan
*Attorney, Agent, or Firm*—Sandler & Greenblum

[57] ABSTRACT

The invention relates to a protective device formed by a hollow body with a first end, a second end and a surface wherein at least a section of a surface is provided with a series of corrugations extending longitudinally from the first end and essentially to the second end, wherein a portion of the hollow body has a cylindrical shape and a portion has a frustoconical shape and wherein the corrugations converge towards a point on the longitudinal axis of the hollow body with their depth increasing in the direction of their convergence so that the average diameter of the body decreased in a substantially progressive manner along the longitudinal axis beginning adjacent the first end of the body, preferably wherein an annular element having an exterior diameter corresponding essentially to the exterior diameter of the first end is attached thereto and wherein the second end of the hollow body is opened with its surface folding in towards the interior of the hollow body as a lip and wherein the hollow body is provided with at least one and preferably at least two slits extending longitudinally along the surface of the hollow body wherein slits begin adjacent each of the ends of the hollow body and are aligned longitudinally with respect to each other so as to remain separated by a portion of the surface of the hollow body which is preferably located closer to one end of the hollow body than the other, and wherein the surface is also provided with an opening having a hinged strip corresponding in size to the opening which pivots into the interior of the hollow body, and wherein the corrugations have an arcuate surface.

27 Claims, 10 Drawing Figures

PROTECTIVE DEVICE AND METHOD FOR FORMING PROTECTIVE DEVICE AND USE OF PROTECTIVE DEVICE AS A PACKAGE AND APPARATUS FOR FORMING PROTECTIVE DEVICE

FIELD OF THE INVENTION

The present invention relates to a hollow body formed so as to have utility as a protective device for packaging articles. The invention also relates to a method for manufacturing the hollow body and the use of the hollow body as a protective device for packaged articles, as well as apparatus used to form such hollow bodies.

DESCRIPTION OF BACKGROUND RELEVANT MATERIALS

There has been a long-standing need for protective devices in packaging various articles to protect them against damage during shipping, storing, and handling. This is particularly true for mechanical parts, such as swivel journals, universal joints, and similar automobile parts, which are manufactured in one location and shipped to another location for assembly into a designated machine, vehicle, or other mechanical devices.

In the past, such articles have normally been packaged in a bellows-type envelope which is generally made of of elastomeric material, such as rubber. Such materials are used for their elasticity and flexibility in accommodating various sized items as well as for their cushioning effect during shipping and handling.

Nevertheless, such bellows-type wrappers are particularly vulnerable to a number of adverse effects. Thus it is common practice to attempt to protect such wrappers by means of protective devices typically formed of two semi-spherical shells made, for example, of plastic which may be removably connected to each other, for example by an elastic means. These protectors, however, also suffer from numerous disadvantages. In addition to their expense, they are not biodegradable and consequently are not easily disposable. This results with the need to recycle them. Recycling, however, is a time-consuming and often a difficult operation which involves providing for designated deposit areas, scheduling pick-up of the deposited protectors, transportation to the recycling plant, and the recycling procedures themselves which include cleaning and inspection.

In addition to the foregoing disadvantages, problems are often experiened inserting the articles into the elastic protective devices, particularly wherein such articles are oversized and have an irregular shape. Moreover, if an undue amount of stretching the elastomeric material is required in order to fit the protective device over the article, the protective device becomes punctured or torn so as to expose elements of the article it was intended to protect.

The present invention, therefore, was developed to provide a novel product which overcomes the shortcomings and disadvantages of prior art protective devices. The protective device of the present invention is disposable or at least more easily recyclable without sacrificing the desired characteristics of protection, fitting, and removal, as well as ease of maintenance and convenient storage.

Prior art attempts to protect mechanical elements, such as the ends of shaft portions, include the use of cylindrical tubes of cardboard. It was found, however, that starting with a cardboard cylindrical tube, considerable adjustment was required to shape the tube into a frustoconical configuration so as to permit the element being packaged to be wedged within the interior of the tube. In addition, this was a particularly difficult manipulation to accomplish without damaging or destroying the cardboard material. Furthermore, the bulk of void space resulting from forming a cylindrical tube into a frustoconical shape is very cumbersome for handling and storage purposes. In addition, it often causes problems for certain types of elements which need protection which are disposed in the narrower section of the tube, particularly in the case of certain journalled transmission elements for driving the wheels of a vehicle.

It is believed that the present invention proposes a relatively simple solution to these problems and yet offer many advantages which prior art protective devices do not have.

SUMMARY OF THE INVENTION

The product of the present invention is a hollow body, preferably formed of cellulosic material or cardboard substance which can easily be disposed of after use, or recycled in a simple manner.

The process of manufacturing the hollow body according to the present invention first involves providing a roughed-out tube, preferably a cylinder made from spiralled strips of cardboard material, and then manipulating the tube so as shape the cylindrical tube into a hollow body including an upper area with a frustoconical configuration having a narrow top end and a wide base end, and a cylindrical base area beginning adjacent the base end of the frustoconical area and having a correspondingly sized cross-section. The surface defining the frustoconical area of the protective device is preferably provided with a series of folds or corrugations which extend from the narrow end of the frustoconical area to adjacent the base end of the frustoconical area in the vicinity of the beginning of the cylindrical area of the protective device. Preferably the folds extend in an appreciably converging manner towards a point in the longitudinal axis of the protective device. It is also preferably to form corrugations to have depth which increases in the direction of convergence so that the average diameter of the area of the body having corrugations decreases in a substantially progressive manner along its longitudinal axis beginning at or adjacent to the cylindrical area base.

In accordance with the present invention, the folds or corrugations on the roughed-out tube are formed between mating male and female folding elements provided with a plurality of complementary projections and recesses for effecting the folds in the tube by a procedure which involves introducing a male folding element having a frustoconical shape and provided with a plurality of angular projections or blades whose edges are positioned longitudinally along its surface into the tube, and positioning a female folding element having an interior hollow portion by the form of a frustoconical shape which is provided by a plurality of blades or angular projections whose edges are similarly positioned along its longitudinal axis, but whose angle at the apex is more open than that of the frustoconical shape formed by the edges of the male element with the angular distribution of the projections or blades of the male and female elements being the same while the relative angular position of the female elements in the course of their mating being such that the projections or blades of one can insert themselves between the projections of the other.

In one embodiment of the present invention a protective device in the form of a hollow body is provided which has folds or corrugations on at least a section of its surface beginning at one end of the protective device.

In another embodiment of the present invention, the hollow body of the protective device is provided with an annular element or ring, preferably made of cellulosic material or cardboard substance, which is glued or otherwise attached to one of the ends of the protective device, and preferably the narrow end of the frustoconical area, wherein the exterior diameter of the annular element corresponds substantially to the exterior diameter circumscribed by the end of the protective device taking into account the ridged area of the corrugations on the surface of tube at that end.

A further embodiment of the present invention is to provide a protective device with at least one longitudinal slit along at least a portion of the surface of the device preferably extending from at least one end of the device so as to adapt at least one end of the protective device to be widened in order to improve the ease of packaging and withdrawal of the article from the protective device without tearing as well as for reasons which will be discussed in more detail herein below.

A related embodiment of the present invention is a protective device having a least two longitudinally extending slits aligned so as to be separated from each other by a portion of the surface of the protective device which is preferably located closer to one end than the other of the protective device to permit an engargement or widening of the area defined by that portion of the protective device.

A still further embodiment of the present invention is to provide the surface of the protective device with at least one opening having a hinged hatch or strip with a shape corresponding to the shape of the opening adapted to pivot into the interior of the protective-device and contact the article packaged within the protective device and preferably wherein the surface around the cylindrical base area of the protective device is folded towards the interior to form a lip.

A yet still further embodiment of the present invention is an apparatus for forming corrugations, including a table or other support having an opening on which a hollow body to be corrugated and shaped may be positioned, a male corrugation element having a plurality of longitudinal projections operably associated with the support and adapted to pass through the opening in the support for insertion into the interior of the hollow body, a female corrugation element having a series of projections and preferably blades radially attached and extending longitudinally along the interior of the female corrugation element located adjacent the support and adapted to mate with the male element so as to enclose the hollow body to be corrugated and shaped between the male and female elements, wherein the blades or projections of the female element face opposite the grooves between the projections of the male element.

An object of the present invention, therefore, is to provide a hollow protective device having corrugations on its surface which include a plurality of ridges and adjacent valley portions between the ridges with the corrugations converging towards a point in the longitudinal axis of the hollow body while the depth of the valley portions of the corrugations increase in the direction of convergence of the corrugations, preferably so that the average diameter of the hollow body decrease in a substantially progressive manner along the longitudinal axis beginning adjacent the narrow end portion of the hollow body.

Another object of the present invention is to provide a hollow protective device having a first end and a second end which is provided with an annular element or ring attached, for example by gluing or other adhesion, to its first end, wherein the exterior diameter of the annular element corresponds essentially to the exterior diameter of the first end of the hollow body.

A further object of the present invention is to provide a hollow protective device having a first end and a second end wherein the second end is open and the surface of the hollow body folds in towards the interior of the hollow body so as to form a lip on the second end.

A still further object of the present invention is to provide a hollow protective device provided with at least one slit extending longitudinally along its surface, preferably beginning adjacent either its first or second end. It is preferable to provide the device with at least two slits which begin adjacent each of the ends and are aligned longitudinally with respect to each other and have a total length less than the length of the longitudinal surface of the hollow body so that the slits are separated by a portion of the surface. The portion of the surface separating the slits is preferably located closer to one of the ends than the other and is more preferably located nearer the first end of the protective device.

A still yet another object of the present invention is to provide a hollow protective device having a surface with an opening provided with a hinged strip or hatch corresponding in size to the opening which pivots into the interior of the hollow protective device.

A yet still further object of the present invention is a hollow protective device having corrugations with an arcuate surface on at least a section of the hollow protective device wherein the arcuate surface may be a longitudinal curvature and/or a transverse curvature in which case the corrugations in transverse cross-section constitute of series of successive arcs.

Another further object of the present invention is a packaged article including an article having a shaft, an envelope having a surface with bellows covering at least a portion of the article, a protective device encasing at least a portion of the covered article including a hollow frustoconical-shaped body with a first open end and a second open end and having a surface with a corrugated section, an annular element having at least two radial slits attached to the first open end through which the shaft projects and against which the envelope contacts, an opening in the surface of the hollow body having a hinged strip which pivots into the interior of the hollow body in the direction of the first end so as to abutt a bellows on the surface of the envelope, at least two slits in the surface of the hollow body beginning adjacent at least the first end and being aligned with the radial slits of the annular element so as to extend longitudinally along the surface of the hollow body from the radial slits and with respect to each other so that the slits remain separated from each other by a portion of the surface of the hollow body.

Another still further object of the present invention is to provide a mandrel for shaping the hollow body and forming corrugations in a protective device in the form of a frustoconical shaped element having a plurality of angular projections with edges in the form of dihedrals extending longitudinally along the surface of the frustoconical shaped element, said edges describing the shape of a frustoconical area or frustum along a portion of the mandrel and tapering to describe a cylinder or cylindrical area along another portion of the mandrel, wherein the angle at the apex of the dihedrals is preferably within the range of 70° to 80°, and the radius of the dihedrals is about 0.5 mm, and wherein the dihedrals are separated by grooves having a depth which decreases in the direction of the cylindrical area of the mandrel.

Another yet still further object of the present invention is to provide a blade carrier for shaping and forming corrugations in the protective device including an annular element, a cylindrical member having one end connected to the annular element and another open-end, a series of blades radially attached to the cylindrical member and extending longitudinally from the one end, wherein each of the blades has an edge inclined towards the longitudinal axis of the cylindrical member beginning at the open end.

A further object of the present invention is to provide an apparatus for shaping and forming corrugations in protective devices including a support having an opening on which a hollow body to be corrugated is positioned, a frustoconical shaped element having a plurality of angular projections with edges in the form of dihedrals separated by grooves extending along the surface of said element operably associated with said support and adapted to pass through said opening for insertion within said hollow body, a cylindrical member having a series of blades radially attached and extending longitudinally along the interior of the cylindrical member located adjacent said support and adapted to mate with said frustoconical element so as to enclose said hollow body between said frustoconical and said cylindrical member, wherein the blades face opposite the grooves, and further including a means for separating the cylindrical member away from the frustoconical shaped element operably connected to the cylindrical member, wherein the means for separating includes a shaft having a disk attached to one end, said disk having a series of cutouts around its periphery to permit the passage of the blades as the cylindrical member is separated from the frustoconical member.

A still further object of the present invention is to provide a protective device comprising a hollow body with a first portion having a frustoconical shape and, a second portion having a cylindrical shape, and a surface wherein a section of the surface is provided with a series of corrugations extending longitudinally from the narrow end of the frustoconical portion essentially to the beginning of the cylindrical portion.

BRIEF DESCRIPTION OF THE DRAWINGS

The invention will be more clearly understood upon reading the description which follows in reference to the annexed drawings provided herein for illustrative purposes.

DESCRIPTION OF PREFERRED EMBODIMENTS

Figure 1:
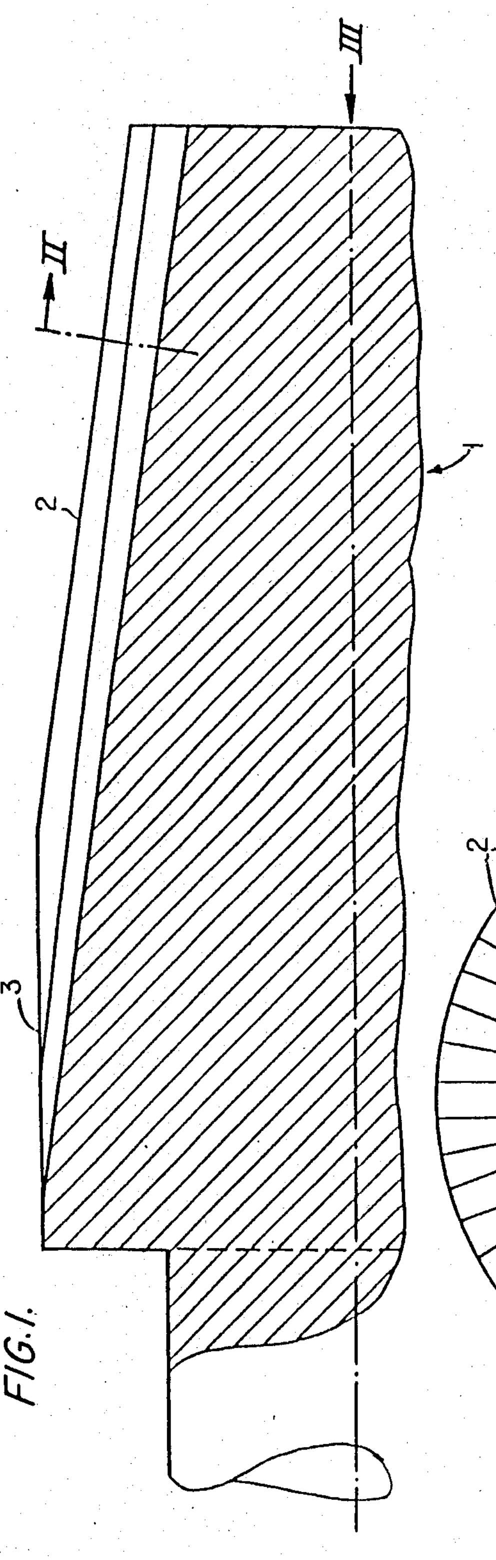
FIG. 1 is a partial longitudinal section showing a folding mandrel according to the present invention.
Figure 2:
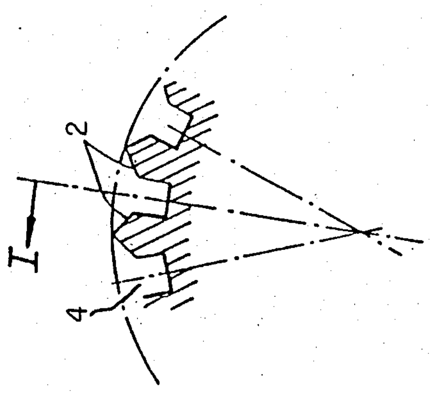
FIG. 2 is a cross-sectional view of the folding mandrel along line II of FIG. 1.

FIGS. 1 and 2 illustrate portions of the mandrel used in the present invention for forming folds or corrugations in the surface of a tube to produce the hollow protective device of the present invention. Mandrel 2 has a frustoconical shape in which a plurality of angular projections in the form of dihedrals have been cut in such a manner that their edges describe the shape of a frustrum along a first, and preferably a major portion, of the length of the mandrel and ultimately taper so as to describe a cylinder along another portion 3 of the mandrel.

Figure 3:
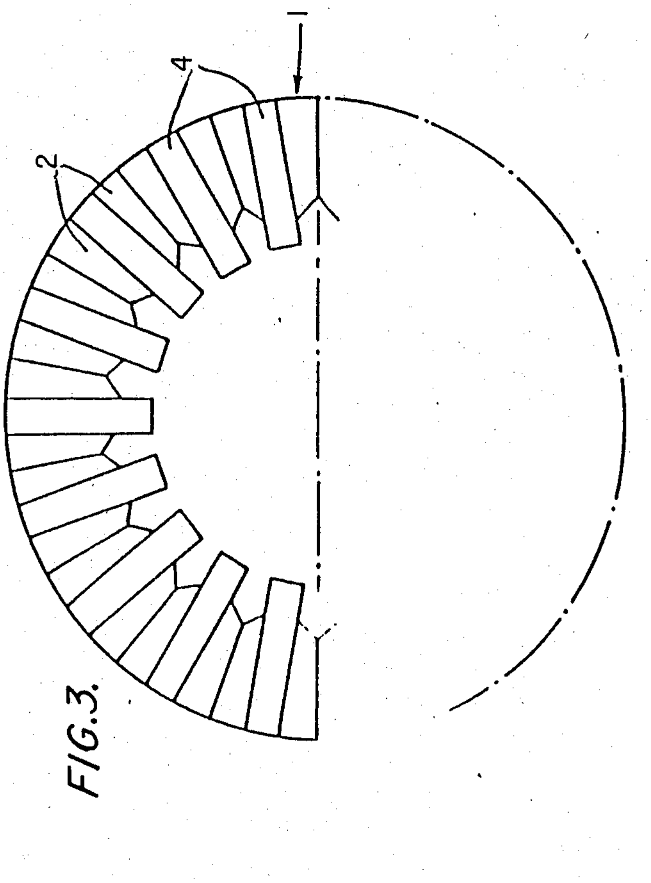
FIG. 3 is a cross-sectional view along arrow III of FIG. 1.

FIG. 3 is a cross-section of the female mating components of the corrugation-forming device.

In the specific example illustrated, the angle at the apex of the dihedrals varies between approximately 70° and 80°. The edges of the dihedrals have a small radius of approximately 0.5 mm. The dihedrals 2 are separated by grooves whose depth decreases in the direction of the cylindrical portion 3 of the mandrel, as will be further discussed below.

Figure 4:
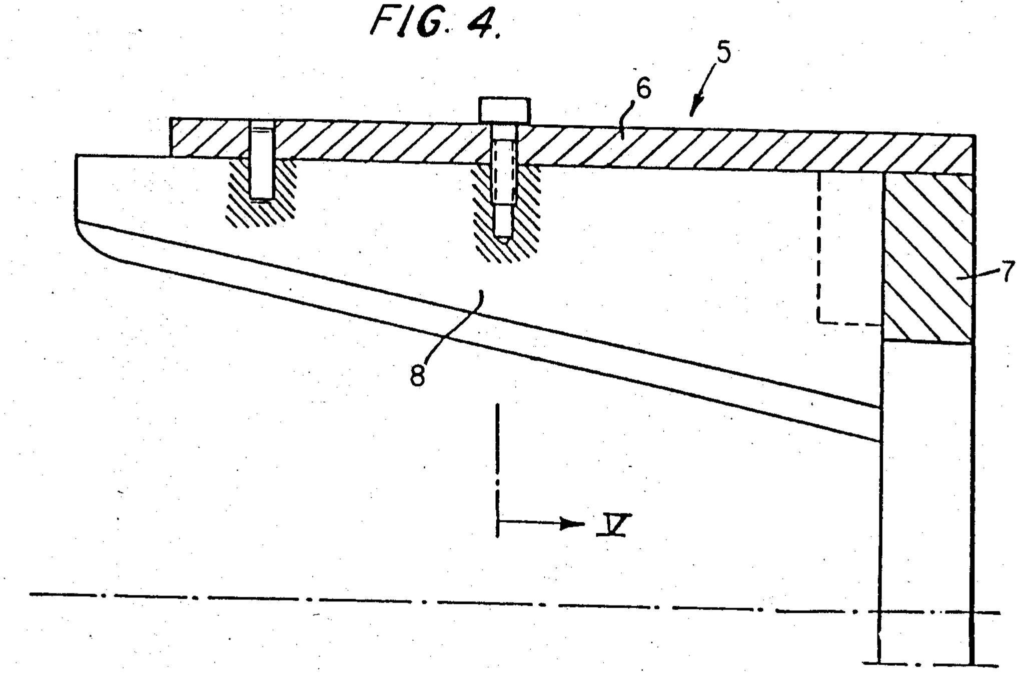
FIG. 4 shows a partial longitudinal sectional view of the blade carrier of the present invention along line 4 of FIG. 5.
Figure 5:
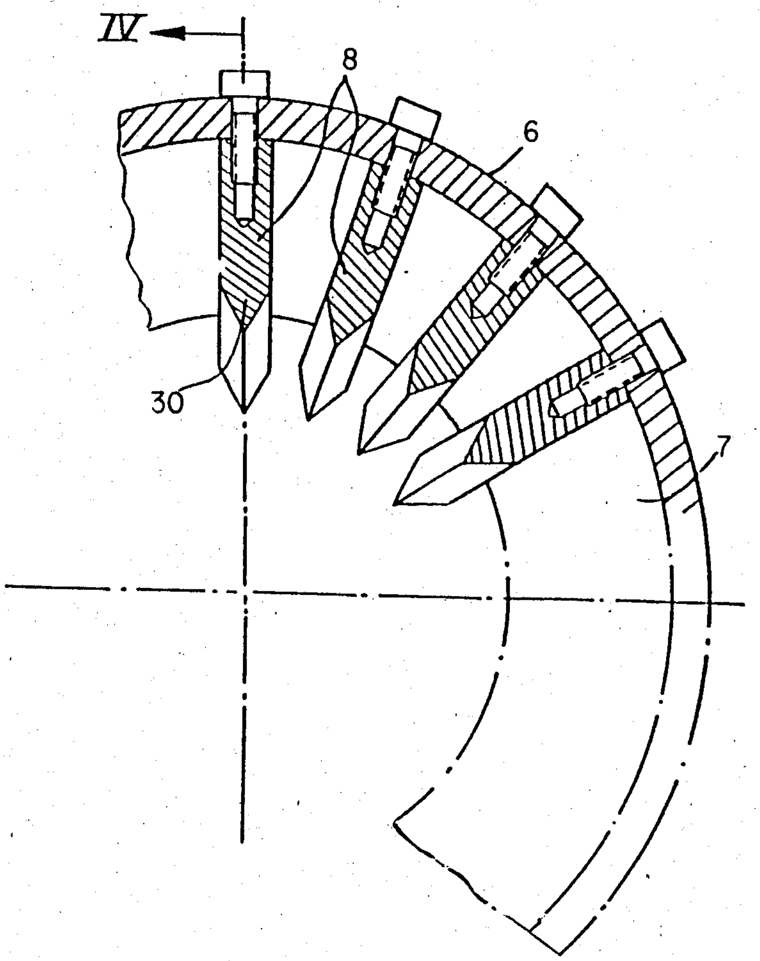
FIG. 5 is a cross-sectional view along line of V of FIG. 4.

FIGS. 4 and 5 illustrate a slide support or blade carrier 5 which is made up of a cylindrical element 6 connected at its rear portion to an annular element or ring 7. As shown, blades 8 are radially attached to cylinder 6 and ring 7. The blades 8 have an edge inclined towards the cylindrical axis 6 beginning at the open portion of the cylinder. Thus, blades 8 are positioned in such a manner that their edges transcribe a frustoconical shape or frustrum whose angle at the apex is slightly more open than that of the truncated cone or frustrum formed by the edges of the dihedrals 2 of mandrel 1. Furthermore, the blades are positioned in cylinder 6 along the same angular distribution as dihedrals 2 of mandrel 1.

Figure 6:
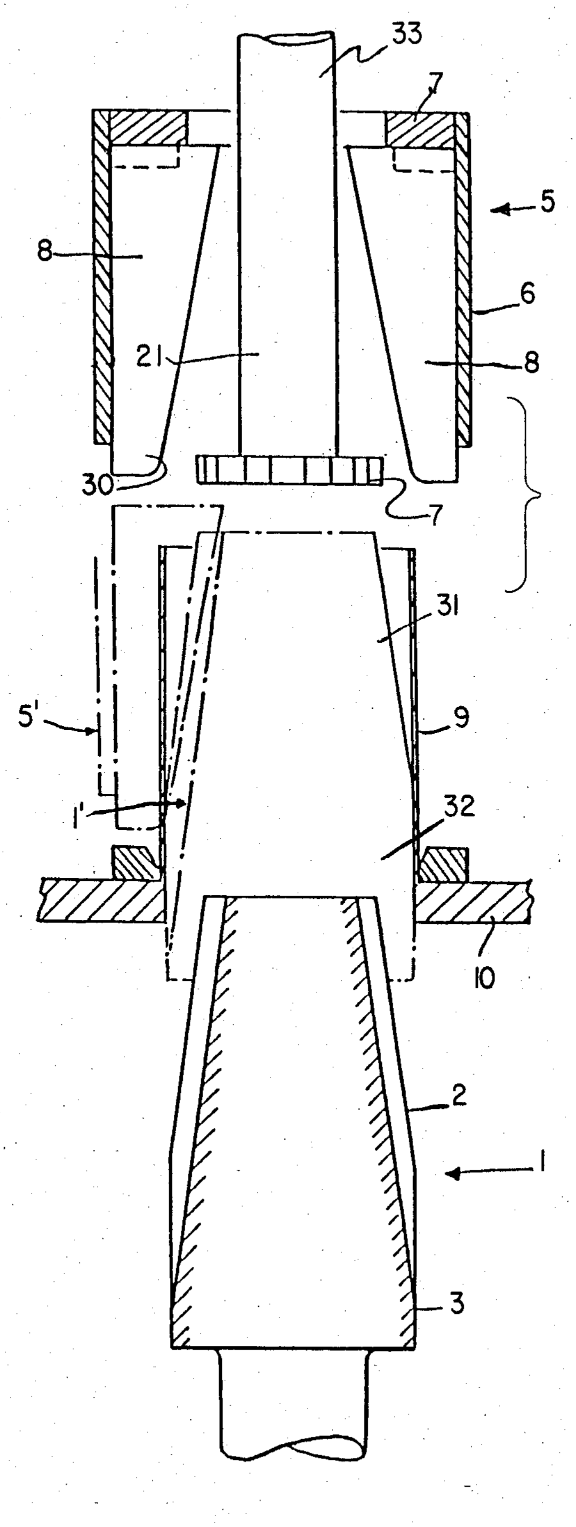
FIG. 6 schematically shows the position of the elements of the preceding figures to illustrate the procedure according to the present invention.

FIG. 6 schematically illustrates the principal of forming a hollow body according to the invention.

The method of the present invention involves first providing a cylindrical tube manufactured by any conventional means. A preferred tube for purposes of the present invention may be made by a technique wherein strips of material are wound around a mandrel as a series of spirals to form a tube which is then cut into pieces of desired length to form roughed-out cylindrical tubes having a circular cross-section 9 which are positioned on table 10 of a press for forming into the protective device of the present invention.

In accordance with the present invention, the press is made up of a male element or mandrel 1 and a female element, i.e., slide support or blade carrier 5, as previously described. Once the tube is positioned on table 10, mandrel 1 is inserted into its interior and blade carrier 5 is positioned over its exterior in a mating relationship.

The mating of mandrel 1 and blade carrier 5 to enclose the tube may be sequential or essentially simultaneous. In any event, the mandrel 1 is introduced into the rough-out tube and the blade carrier 5 surrounds the rough-out tube by assuming respective positions 1' and 5', shown as broken lines in FIG. 6.

The relative angular position of mandrel 1 and blade carrier 5 is such that the blades are essentially facing opposite grooves 4 of mandrel 1. Particularly good results are achieved when the diameters of the cylindrical portion 3 of the mandrel 1 and the circle described by the rotation of the interior portions 30 at the narrow end of blades 8, respectively, are substantially equal to the interior and exterior diameters of roughed-out tube 9. Accordingly, the mating of blades 8 and dihedrals 2 at the position shown as 5' and 1' will form a series of folds along a substantial extent of the surface of roughed-out tube so as to result with a hollow body having a corrugated frustoconical section or frustrum 31 and an essentially smooth cylindrical section 32 having a circular base.

In this regard, it should be pointed out that grooves 4 in mandrel 1 decrease in depth until they disappear at the level of the beginning of the cylindrical portion of the mandrel 3.

Subsequently, when mandrel 1 and blade carrier 5 are separated away from each other, the hollow body which has been shaped between the mandrel and the blade carrier to have a partially corrugated surface is removed. The blade carrier 5 is separated from mandrel 1 by means of retractor 21 having a shaft 33 connected to a transverse ring or disk 7' which is adapted to lift blade carrier 5 away from the shaped tube. The disk 7' of retractor 21 has a series of cut-outs around its periphery to permit the passage of blades 8 therebetween. Alternatively, other means may be used for feeding roughed-out tubes to the press and for releasing the shaped tubes from the forming elements.

In addition, mandrel 1 can be replaced by a blade carrier whose blades can be turned towards the exterior and blade carrier 5 can be replaced by a hollow cone provided with angular projections and grooves which are turned towards the interior, the role of elements 1 and 5 being reversed in forming the fold to corrugate the surface of the tube.

The hollow body 11 shaped in accordance with the present invention is depicted in FIGS. 7 through 10. As shown, body 11 is provided with a series of folds or corrugations 12 which converge towards first end A of the hollow body. The depth of the valleys 34 between the ridges 35 of corrugation 12 increase in the direction of convergence towards end A. This is a result of the different conicities described by the rotation of blades 8 and dihedrals 2. In addition, the folds or corrugations are formed, due in part to the properties of the cellulosic material or cardboard substances used, to have a slight longitudinal curvature despite the shape of mandrel 1. The corrugations or folds may also be formed to have an arcuate surface in transverse cross-section so as to constitute a series of successive arcs around the surface of the hollow body.

FIGS. 7–10 further illustrate an embodiment of the present invention wherein body 11 is provided with an annular element or ring 13, preferably made of cellulosic material or cardboard substance, which is attached, preferably by glue or other adhesive, so as to adhere to the narrow end A of body 11. As shown, ring 13 has a concentric central opening and an exterior diameter which corresponds to the exterior diameter of narrow end A of body 11.

In addition, body 11 is shown as having an opening 14 provided with a hinged hatch or strip 15 which pivot by being pushed into the interior of body 11. In so doing, strip 15 opens inwardly towards the narrow end A of body 11.

Body 11 may also be provided with at least two longitudinally aligned slits 16 and 16' separated by a small portion 17 of the surface of body 11. In this instance, the total length of slits 16 and 16' is less than the length of the protective device. As illustrated, annular element 13 may be provided with slits or be composed of semi-circular elements having a space therebetween positioned so as to align with slits 16 and 16' as an extension thereof.

Figure 7:
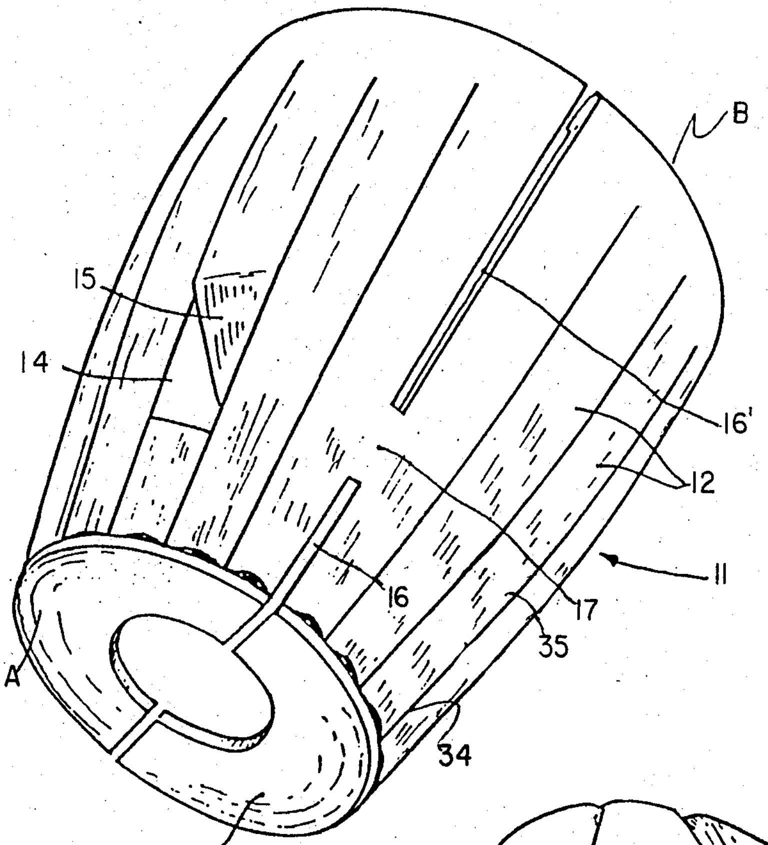
FIGS. 7 and 8 show two different perspective views of a hollow body, made preferably of cardboard, according to the present invention.
Figure 8:
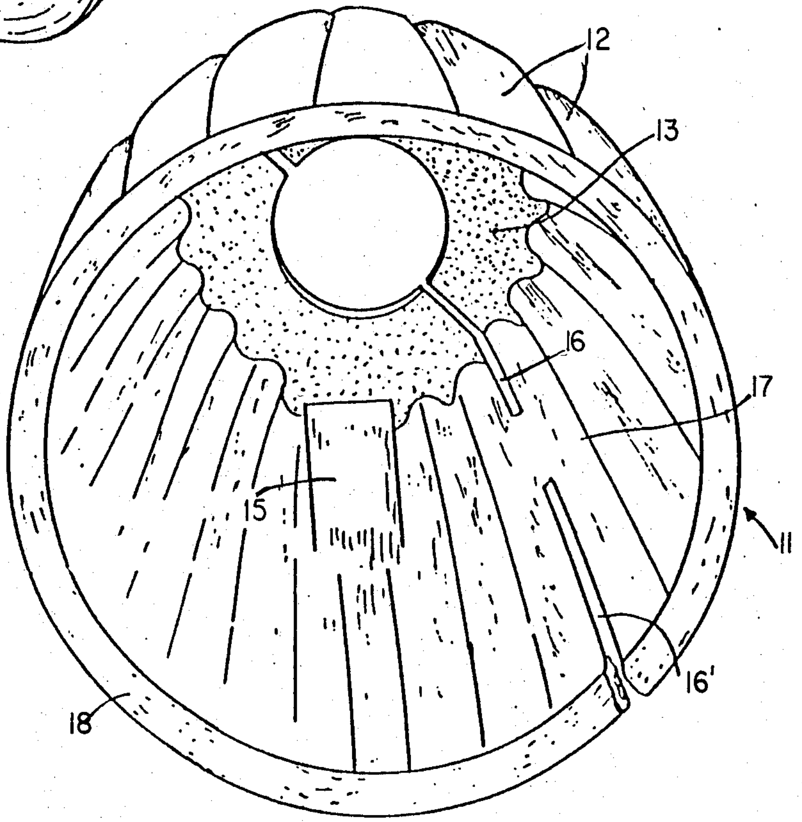
Figure 9:
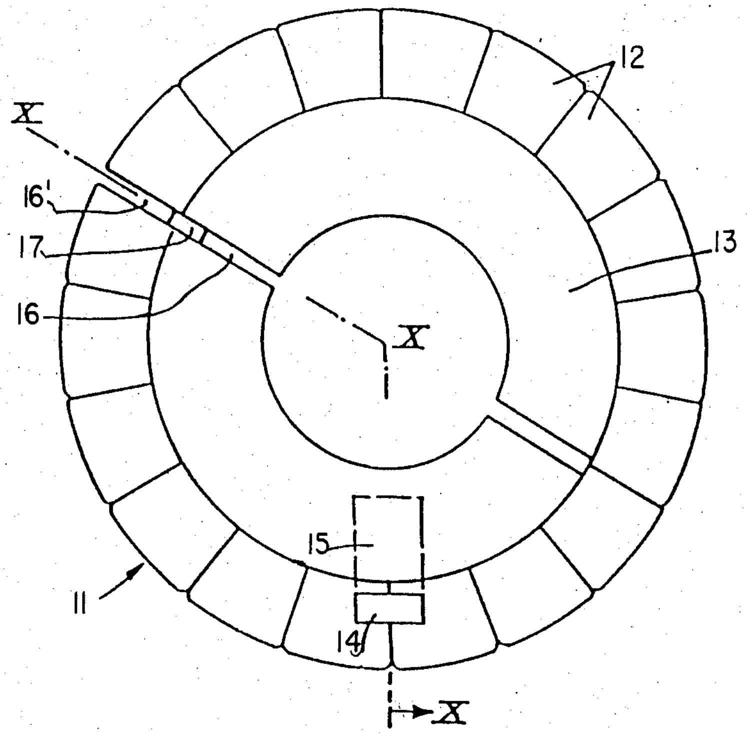
FIG. 9 is a view in part from the narrow end of the hollow body shown in FIGS. 7 and 8.
Figure 10:
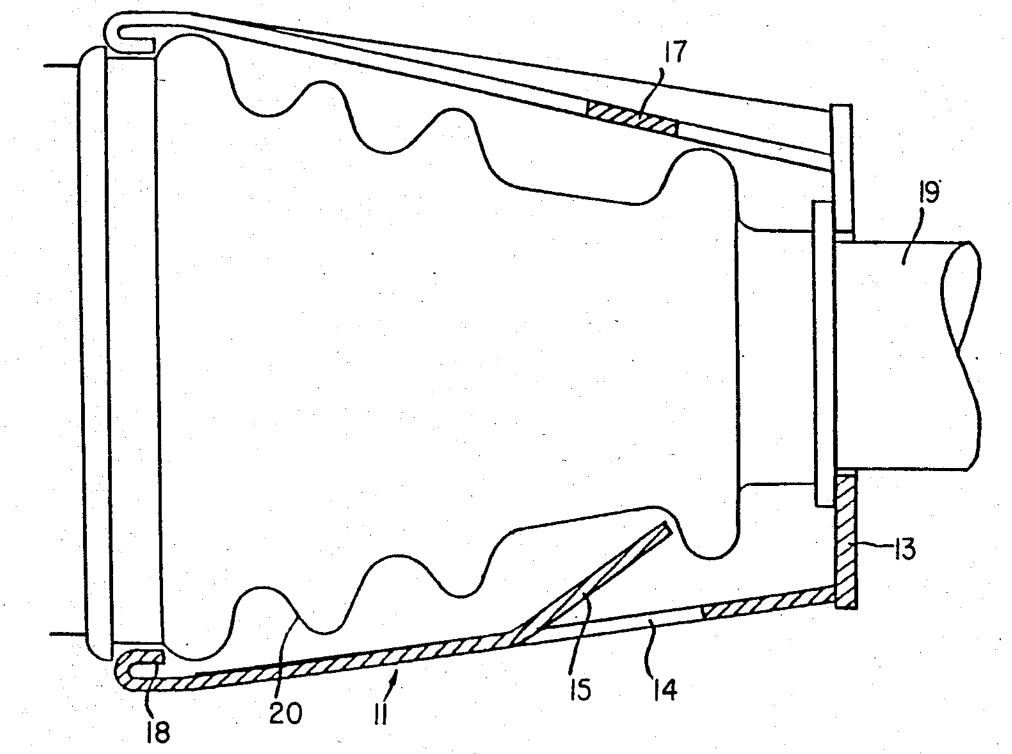
FIG. 10 is a cross-sectional view of the hollow body along broken line x-x of FIG. 9 and in which a packaged article to be protected has been sketched.

Body 11, shown in perspective in FIGS. 7 and 8, in transverse cross-section in FIG. 9 and in longitudinal cross-section in FIG. 10, may be adapted to protect a packaged article positioned at the end of a shaft 19 and covered by envelope 20 having bellows-type folds around its surface.

As shown in FIG. 10, the surface of body 11 at end B folds in towards the interior of the hollow body as a lip around the base end of the cylindrical portion of the hollow body. The resultant fold or lip 18 is adapted to contact the major diameter of a bellows or peripheral fold in cover 20. The annular element 13 is also shown as contacting the narrow end of the cover 20. The inner diameter of the central opening of annular element 13 corresponds essentially to the diameter of shaft 19 projecting therethrough. In this arrangement, hinged strip 15 is shown as being pushed to open into the interior of hollow body 11 towards end A so as to abut the first fold of the bellows 20. In this way, the protective device of the present invention is adapted to support the covered article contained therein so as to prevent the article from extreme movements and to cushion it against shock. Accordingly, the packaged article within the protective device is particularly easy to handle when gripping it around the area below annular ring 13.

As shown further in FIG. 10, the interior and exterior projections of the folds or corrugations have a varying amplitude to ensure a proper fit and good shock absorption.

In accordance with the present invention, the positioning of the article to be packaged is relatively simple. All that is required is to slide shaft 19, attached to the article, through the interior of hollow body 11 and through the central opening in annular element 13. The shaft may then be pulled until the article covered by the bellows 20 is properly positioned within hollow body 11. In so doing, slits 16 and 16' expand to insure that the hollow body enlarges to the necessary extent. This capability of expanding the diameter of hollow body 11 also comes into play when the shaft 19 is pulled at an angle relative to the surface of hollow body 11. Furthermore, slits 16 and 16' make it possible to easily remove the article from the hollow body simply by tearing a small portion of surface 17. The different functions of slit 16 and 16' make them a particularly valuable means for solving delicate problems at the same time.

Numerous modifications or variations of the protected device of the present invention can be invisioned without going beyond the scope of the invention. Thus, notwithstanding the advantageous discussed above, slit 16 and 16', opening 14 and hinge strip 15, and annular clement 13 can be eliminated or be present in a different number than that which is shown and described herein. In addition, the number of folds or corrugations and their depth may also vary depending upon the intended use for the hollow body.

Moreover, contrary to what is described, the folds can be accentuated at one end, either by tapering from the circular base of the roughed-out tube, or by shrinking the base.

It should be clear that if the product according to the invention is specifically adapted for use as a protective device shown in FIG. 10, the configuration which facilitates its storage and enhances its strength also confers to it properties which are useful for protecting different articles having other shapes and sizes.

Finally, it is also possible, while remaining within the scope of the invention, to provide a hollow body provided with folds or corrugations on only a section of its surface. In this instance, the male and female tools would be provided with cylindrical sections with smooth surfaces. It is also possible to produce hollow bodies having other than circular bases such as truncated cones having elliptical bases, or the like. Although the hollow body thus obtained has been designed for specific use, it can serve numerous other purposes to which an element with frustoconical, a cylindro-truncated or cylindro-ogical or truncated form obtained in a unique manner from a cylindrical tube with a circular base can be used. Such hollow bodies exhibit unexpected strength and shock absorbing properties which make it particularly useful as a protective device or packaging element, for example for an article or mechanical part.

From the foregoing description, one skilled in the art can easily ascertain the essential characteristics of this invention and, without departing from the spirit and scope thereof, can make various changes and modifications of the invention to adapt it to various usages and conditions.

We claim:

1. A protective device comprising:

A hollow cardboard body fabricated from a cylindrical cardboard tube to have a surface defining a frustoconical area and a cylindrical area wherein said surface is provided with a series of corrugations including a plurality of ridges and adjacent valleys extending longitudinally along essentially the entire length of surface defining said frustoconical area and coverging towards a point on the longitudinal axis of said body, said corrugations having a depth which increases in the direction of the convergence of said corrugations, so as to provide said frustoconical area of said body with an average diameter which decreases in a substantially progressive manner along the longitudinal axis of said frustoconical area of said body beginning adjacent said cylindrical area.

2. A protective device in accordance with claim 1, further comprising an annular element having a concentric opening attached to said end.

3. A protective device in accordance with claim 2, wherein said annular element is glued to said end.

4. A protective device in accordance with claim 3, wherein the exterior diameter the of circumference of said annular element corresponds essentially to the exterior diameter of said end.

5. A protective device in accordance with claim 4, wherein said annular element is adapted to have at least one slit projecting radially from said opening to the exterior circumference of said element.

6. A protective device in accordance with claim 1, wherein said cylindrical area has an end and said surface folds in towards the interior of the cylindrical area of the hollow body as the lip of said end.

7. A protective device in accordance with claim 1, wherein said hollow body is provided with at least one slit extending longitudinally along said surface.

8. A protective device in accordance with claim 7, wherein said slit begins adjacent either said end.

9. A protective device in accordance with claim 8, wherein said at least one slit is at least two slits.

10. A protective device in accordance with claim 9, wherein said slits begin adjacent each said end and align longitudinally with respect to each other, said slits having a total length less than the length of said surface so that said slits are separated by a portion of said surface.

11. A protective device in accordance with claim 10, wherein said portion is located closer to one said end than the other said end.

12. A protective device in accordance with claim 11, wherein said portion is located closer to the end of the frustoconical area than the end of the cylindrical area.

13. A protective device in accordance with claim 1, wherein said surface has an opening provided with a hinged strip adapted to contact an article positioned within said protective device.

14. A protective device in accordance with claim 13, wherein said hinged strip corresponds in size to said opening.

15. A protective device comprising in accordance with claim 14, wherein said hinged strip pivots into the interior of said body.

16. A protective device in accordance with claim 1, wherein said corrugations having an arcuate surface.

17. A protective device in accordance with claim 16, wherein said arcuate surface is a longitudinal curvature.

18. A protective device in accordance with claim 17, wherein said arcuate surface is a transverse curvature whereby said corrugations in transverse cross-section constitute a series of successive arcs.

19. A protective device comprising:

a hollow body having a surface defining a frustoconical area having an end and a cylindrical area having an end, wherein at least a section of the surface defining said frustoconical area is provided with a series of corrugations extending longitudinally along essentially the entire length of said section of the surface, said corrugations converging towards a point on the longitudinal axis of said body and having a depth which increases in the direction of convergence, and wherein said surface has at least two slits extending longitudinally along the surface of said hollow body, one of said slits beginning adjacent the end of said frustoconical area and another of said slits beginning adjacent the end of said cylindrical area, said one and another slits having a total length less than the total length of said surface and being aligned with respect to each other so that said one and another slits are separated by a portion of said surface.

20. A packaged article including:

(a) a protective device comprising:

a hollow body having a surface defining a frustoconical area and a cylindrical area, the surface defining said frustoconical area being provided with (i) longitudinal corrugations, and (ii) at least two longitudinal slits; and (b) an article positioned within said protective device so as to be at least partially encased by the surface defining the frustoconical area of said hollow body.

21. A packaged article in accordance with claim 20, wherein said frustoconical area has an end and further comprising an annular element having a central opening and an exterior diameter corresponding to the exterior diameter of said end attached to said end.

22. A packaged article in accordance with claim 21, wherein said article is connected to a shaft and said shaft projects through said opening.

23. A packaged article in accordance with claim 22, wherein said surface is provided with an opening having a hinged hatch which pivots into the interior of said body in a direction towards said end.

24. A packaged article in accordance with claim 23, wherein said cylindrical area has an end and said surface folds towards the interior of the cylindrical area as the lip of said end.

25. A packaged article in accordance with claim 24, further comprising an envelope at least partially covering said article, said envelope having an exterior surface, a major end and a minor end with peripheral folds spaced at intervals along said surface from said major end to said minor end, wherein said hatch contacts one of said peripheral folds.

26. A package article in accordance with claim 25, wherein said major end of said envelope rests on said lip.

27. A package article in accordance with claim 26, wherein said slits have a total length less than the length of said surface and are aligned with respect to each other so as to remain separated by a portion of said surface, thereby permitting enlargement of said hollow body to accommodate said article.

* * * * *

UNITED STATES PATENT AND TRADEMARK OFFICE
CERTIFICATE OF CORRECTION

PATENT NO. : 4,693,919

DATED : September 15, 1987

INVENTOR(S) : Jean-Paul LANGUILLAT et al.

It is certified that error appears in the above-identified patent and that said Letters Patent is hereby corrected as shown below:

At column 1, line 29 delete "of" (second occurrence).
At column 1, line 50 change "experiened" to ---experienced---.
At column 2, line 29 insert ---to--- after "so as".
At column 2, line 44 change "preferably" to ---preferable---.
At column 3, line 34 change "engargement" to ---enlargement---.
At column 4, line 3 change "decrease" to ---decreases---.
At column 4, line 43 change "of" (first occurrence) to ---a---.
At column 4, line 57 change "abutt" to ---abut---.
At column 7, line 51 change "corrugation" to ---corrugations---.
At column 8, line 4 change "pivot" to ---pivots---.
At column 8, line 64 change "invisioned" to ---envisioned---.
At column 8, line 68 change "clement" to ---element---.
At column 9, line 64 change "the of" to ---of the---.
At column 10, line 36 change "having" to ---have---.

Signed and Sealed this

Twentieth Day of September, 1988

*Attest:*

DONALD J. QUIGG

*Attesting Officer*

*Commissioner of Patents and Trademarks*